United States Patent [19]

Kim et al.

[11] Patent Number: 5,292,511
[45] Date of Patent: Mar. 8, 1994

[54] PROCESS FOR MANUFACTURING A HEALTH-SUPPLEMENTARY FOOD CONTAINING ALOE AS AN ACTIVE INGREDIENT

[75] Inventors: Il C. Kim; Sang Y. Lee; Chang W. Choi, all of Seoul, Rep. of Korea

[73] Assignee: Pulmuwon Food Co., Ltd., Chengcheongbuk-Do, Rep. of Korea

[21] Appl. No.: 989,540

[22] Filed: Dec. 11, 1992

[30] Foreign Application Priority Data

Jul. 3, 1992 [KR] Rep. of Korea ............... 92-11893

[51] Int. Cl.$^5$ .............................................. A61K 35/78
[52] U.S. Cl. ................................................. 424/195.1
[58] Field of Search ....................................... 424/195.1

[56] References Cited

U.S. PATENT DOCUMENTS 3,878,197 4/1975 Maret ............................. 424/195.1
3,920,816 11/1975 Seegall et al. ................ 424/195.1
4,959,214 9/1990 McAnalley .................... 424/195.1

*Primary Examiner*—John W. Rollins
*Attorney, Agent, or Firm*—Spencer, Frank & Schneider

[57] ABSTRACT

A process for manufacturing a health-supplementary food containing aloe as an active ingredient, including, in the order recited, the steps of washing aloe, fresh leaf vegetables including kale, root vegetables including carrot, and fruit including tomato thoroughly with water; pulverizing from 70 to 85 wt. % of aloe, from 10 to 20 wt. % of leaf vegetables including kale, from 5 to 15 wt. % of root vegetables and fruit including, respectively, carrot and tomato, into pieces having a length of 2 cm or less using a chopper to provide a pulverized mixture; mixing sugar with the pulverized mixture to provide a sugar concentration for the mixture of from 15 to 37.5 Brix; innoculating the mixture with from 2 to 5% by weight of a starter per 100% by weight of total starting materials, the starter having been cultured from a strain of Lactobacillus family grown in an MRS medium, in a fermenter at a temperature ranging from 20° to 35° C.; fermenting the mixture for from 48 to 96 hours, stopping fermentation when the mixture has a pH ranging from 3.2 to 3.7; squeezing the mixture using a press to obtain a fermented liquid, admixing additional sugar with the fermented liquid until homogenized to maintain the sugar concentration at a range of from 50 to 60 Brix; and aging the mixture at room temperature for several months.

8 Claims, No Drawings

PROCESS FOR MANUFACTURING A HEALTH-SUPPLEMENTARY FOOD CONTAINING ALOE AS AN ACTIVE INGREDIENT

FIELD OF THE INVENTION

This invention relates to a manufacturing process for an aloe supplementary food made by fermenting and aging.

More specifically, it relates to a process for preparing a nutritional supplement of fermented plant extract in liquid phase by using aloe alone or combined with leaf vegetables, such as Angelica utilis and Kale, root vegetables and fruits, such as respectively, carrots and tomatoes, in a given ratio, then adding a mixture of saccarides for fermentation, with or without a starter of the Lactobacillus family, followed by aging with addition of additional saccharides for a given period.

DESCRIPTION OF THE PRIOR ART

With a better standard of living and an improved quality of life, people have shown a growing interest in natural foods that can keep them healthy. Especially, aloe has recently drawn keen interest and related research for the same is briskly underway.

Belonging to the aloe family of lilies, aloe is a perennial herb originated in Africa and, nowadays, it is extensively grown as one of the medicinal plants worldwide in both tropical and temperature zones.

Aloe is in general used as first aid in the treatment of bruises or burns associated with fire, radiation, or sunlight. Besides, aloe is also used to protect skin from freckles and flecks, etc., while its antimicrobial effect is useful in treating athlete's foot and eczema. Recently, aloe has been used not only in treating gastric ulcer, constipation, or diabetes, but also as a nutritional supplement for modern people who want to stay healthy.

Nevertheless, since fresh aloe extract in gel form has its own distinct taste and flavor, often regarded as unpleasant, it is quite difficult to consume as it is.

Furthermore, gel type aloe is not stable, and after harvest, it is easily oxidized and discolored. And, gel type aloe is vulnerable to microorganisms, such as fungi and bacteria, thus leading to decrease in the amounts of active ingredients.

In order to solve such problems as, a) disgusting taste and flavor, b) inconvenient oral administration due to the physical properties, and c) low stability, various processing methods have been investigated.

In general, the current processing methods for aloe supplements can be largely divided into following two methods:

The first method is to process raw leaves of aloe (therefor)—by a process in which the aloe is—lyophilized or dried by hot air and is processed into powder, tablet, or capsule form.

The second method is either to manufacture a final product by mixing the gel extract of aloe with agar in small amounts, or to manufacture a final product in liquid phase after concentrating the above extract.

More specifically, the former method is to either process raw, cut leaves of aloe by hot-air drying at a temperature ranging from 50° to 60° C., or to process aloe powder obtained from lyophilization of the aloe gel extract after removing its husk into powder, tablet, or capsule form.

The second method is either to manufacture a final product by mixing the gel extract of aloe with agar and Vitamin C in small amounts, or to manufacture a highly concentrated product in liquid phase after concentrating the above extract.

However, such two methods have some disadvantages as follows:

Aloe extract in powder, tablet, or capsule form based upon the first method aids merely by improving the inconvenience of taking aloe gel while its disgusting odor and taste remain intact and, during storage, discoloration of its green pigment could result.

Aloe in liquid phase based upon the second method contains some chemical preservatives, such as sodium benzoate or potassium sorbate, to enhance its stability.

Even though the gel extract of aloe has little difference in taste and odor compared with original aloe, its distinct nature still induces a disgusting feeling when taken orally.

Therefore, one object of the invention herein is not only to enhance one's liking palatability by eliminating the disgusting taste and improving the flavor of aloe itself, but also to provide enhanced stability without any harmful preservatives.

Another object of the invention is to expand the applicable scope of a final product containing aloe.

SUMMARY OF THE INVENTION

According to this invention, the health-supplement food containing aloe as an active ingredient is made available by the following processes.

A process of preparing only aloe without any other ingredients.

A process in which the gel type extract of aloe is mixed with some leaf vegetables, for example Angelica Utilis and kale, root vegetables and fruits in given ratios and then, a certain amount of sugars is added to the mixture for natural fermentation;

A process in which the above mixture is inoculated with a strain of lactobacillus family and aged for several months after adding a certain amount of additional sugars.

Each process of this invention can be described as follows:

1) Washing fresh aloe, leaf vegetables, e.g., Kale, root vegetables, e.g., carrot, and fruits as the raw materials with water.
2) Mixing 70 to 85% of aloe, 10 to 20% of leaf vegetables, and 5 to 15% of root vegetables and fruits, or using 100% of aloe as the raw material, then pulverizing the above materials into pieces of less than 2 cm in length with a chopper or cutter.
3) Adding sugar to said pulverized materials and mixing until homogeneous. Here, any kind of edible sugars can be used and should be added until 15 to 37.5 Brix of sweetness for the mixture is reached.
4) Transferring the mixture into a fermenter having a temperature adjusted at 20° to 35° C. for fermenting naturally or, at the same temperatures, adding Starter for 48 to 96 hours' fermentation. The Starter used herein is a strain of lactobacillus family and 2 to 5% of starter should be added in proportion to the total amount of vegetables including aloe.
5) Squeezing the mixture to obtain fermented liquid with a squeezer.
6) Adding and mixing more sugar to the fermented liquid until homogeneous, then aging the same at 20° to 35° C. for several months. Here, sugar should be added up to 50 to 60 Brix of sweetness.
7) Removing completely any of vegetable residues contained in the aged liquid by centrifuge.
8) Packing the pure fermented and aged liquid in a predetermined volume for consumption.

In accordance with the aforementioned process, the health supplementary aloe food can be prepared.

For the raw materials according to this invention, either 100% of aloe is solely used or other vegetables may be selected in a following manner, i.e., 70 to 85% of fresh aloe, 10 to 15% of leaf vegetables such as fresh kale, and 5 to 15% of root vegetables & fruits such as carrot and tomato respectively. Here, the indication "%" expressed in this invention denotes "weight %", unless otherwise specified.

In the case where 100% of aloe is used, or another formula in which 70 to 85% of aloe is mixed with 10 to 20% of leaf vegetables and 5 to 15% of root vegetable & fruits is used, the taste, color and flavor of the final product proved to be superior. If deviated from, however, the taste and flavor are so bad as to induce rejection, and the color is also poor.

The leaf vegetables that can be used in this invention include carrot leaf, mugwort, green onion, bracken, sweet potato stalk, spinach beet, sesame leaf, shepherd's purse, sedum sarmentosum, dropwort, chinese cabbage, leek, amaranth, lettuce, spinach, celery, angelica utilis, crown daisy, mallow, cabbage, bamboo sprout, plantain, CHYI fresh, kale, winter grown chinese cabbage, and bean leaf. It is appropriate to use one or more vegetables within the allowable scope of the mixing ratio.

Also, the root vegetables and fruits that can be used in this invention include carrot, tomato, cucumber, kiwi, eggplant, old pumpkin, wild rocambole, garlic, Chinese bellflower, onion, lotus root, taro, pimento, radish, hot green pepper, watermelon, melon, green pumpkin, and oriental green plum. It is appropriate to use one or more vegetables within the allowable scope of the mixing ratio.

The sugars that can be used in this invention include glucose, fructose powder, high fructose corn syrup, sucrose, maltose, lactose, and oligo saccharides. It is appropriate, if necessary, to use one or more sugars.

The reason that the amount of sugar added should be up to 15 to 37.5 Brix of sweetness for the mixture is as following:

The white color of gel extracted from Aloe leaves turns to reddish purple with the lapse of time afterward. Such discoloration may be ascribable to the fact that some ingredients of aloe bind with oxygen in the air and are oxidized, or to the catalytic action of enzymes contained in the extract in the presence of oxygen. This is known to cause the decrease of active components. The inventors of this invention found that the discoloration of aloe can be prevented with added sugar in the amount described above.

If the sweetness of the mixture is within 15 to 37.8 Brix, the color is stable without any discoloration, but if the degree is less than 15 Brix, discoloration occurs. And exceeding 37.5 Brix is useless because the reaction rate of the fermentation process is remarkably slowed down.

Also, the fermentation temperature in the above process 3) should be desirably maintained at 20° to 35° C. If the fermentation temperature is less than 20° C., the fermentation rate becomes very slow. If it exceeds 35° C., the flavor of fermentated product is poor and this may affect palatability.

The process of fermentation in this invention may be conducted by adding 2 to 5% to Starter cultivated from a strain of the lactobacillus family for 48 to 96 hours of fermentation. Under such conditions, fermentation could start a little earlier. Alternatively, natural fermentation may be conducted in fermenter adjusted at 20° to 35° C.

The bacteria can be used in this invention include lactobacillus delbrucki, lactobacillus lactis, lactobacillus leichimanii, lactobacillus homohiochii, lactobacillus acidophilus, lactobacillus casei, lactobacillus sake, lactobacillus bulgaricus, lactobacillus xylosus, lactobacillus helveticus, and lactobacillus plantarum.

In the above process 5), the ratio of sugar added to fermentation liquid should produce desirably 50 to 60 Brix. If the ratio of sugar is less than 50 Brix, an acidic membrane is formed because of microorganisms' growing and multiplying, that may adversely affect the quality. Also, if it exceeds 60 Brix, a strong sweetness of the final product results and may not be preferred. However, if the ratio of sugar is within 50 to 60 Brix, no change in quality has been detected in spite of prolonged storage and during the aging period, and the flavor of the final product can be further improved.

The reason that the sweetness during the aging period should be within 50 to 60 Brix is as follows:

The gel extracted from aloe leaves easily rots because of some microorganisms, such as fungi or bacteria and, thus, it cannot be stored for a prolonged time. To solve this problem, some chemically synthesized preservatives, such as sodium benzoate or potassium sorbate, are currently being used for the enhancement of stability, and the amount of preservative added is about 0.5%.

Nevertheless, the use of preservatives should not be recommended because the same may be harmful to the human body. The inventors of this invention have developed a storage method by sugaring which can prevent the decomposition of aloe and store the same safely for a prolonged time without using any synthetic preservatives.

DESCRIPTION OF THE PREFERRED EMBODIMENTS

This invention can be described in more detail based upon some preferred embodiments as set forth hereunder.

EXAMPLE 1

Wash thoroughly fresh aloe with water.

After washing, 10 kg of aloe was pulverized to pieces about 1 cm in length by a chopper. Addition of 4 kg of high fructose corn syrup was made to the pulverized material and mixed until homogeneous and until its sweetness degree reached 25 Brix. The mixture was transferred into a fermenter adjusted at 25° C. for natural fermentation, and the mixture was squeezed by a squeezer to obtain the fermented liquid. More of the high fructose corn syrup was added to the fermented liquid and mixed until homogeneous and until its sweetness degree reached 57 Brix, and the mixture was aged at 25° C. for 3 months. After being aged, a centrifuge was used to completely remove any of vegetable residues contained in the liquid. Thus, a pure, fermented and aged liquid is obtained therefrom.

EXAMPLE 2

Fresh aloe, kale and carrot were washed thoroughly with water. After washing 7 kg of aloe, 2 kg of kale, and 1 kg of carrot was pulverized into pieces of about 1 cm in length with a cutter. The addition of 4 kg of high fructose corn syrup was made to the pulverized material and mixed until homogeneous and until its sweetness degree reached 25 Brix. The mixture was transferred into a fermenter adjusted at 35° C. for natural fermentation.

After fermentation, squeeze the mixture by a squeezer to obtain the fermented liquid and add a mixture of maltose and sugar, (6:4) mixture, and mix until homogeneous and until its sweetness reaches 57 Brix, then age the mixture at 25° C. for 3 months. After aging, use a centrifuge to completely remove any vegetable residues contained in the liquid. Thus, a pure, fermented and aged liquid is obtained therefrom.

EXAMPLE 3

Fresh aloe, Angelica utilis, and tomato were washed thoroughly with water. After washing, 8.5 kg of aloe, 1 kg of Angelica utilis, and 500 g of tomato was pulverized into pieces of about 1 cm in length with a cutter. The addition of 4 kg of high fructose corn syrup was made to the pulverized material and mixed until homogeneous and until its sweetness degree reached 25 Brix. The liquid mixture was transferred into a fermenter adjusted at 25° C. and inoculated with 200 g or 500 g each of starter material cultivated from lactobacillus lactic for 96 hours of fermentation. After fermentation, the liquid was squeezed with a squeezer to obtain the fermented liquid. A 1:1 mixture of maltose and glucose was added to the liquid and mixed until homogeneous and until its sweetness degree reached 57 Brix. This mixture was aged for 3 months at 25° C.

After aging, a centrifuged was used to completely remove any vegetable residues contained in the liquid. Thus, a pure, fermented and aged liquid. Thus, a pure, fermented and aged liquid is obtained therefrom.

EXAMPLE 4

By the same method as in Example 3, a pure, fermented and aged liquid is obtained except that 7.5 kg of aloe, 1 kg of cabbage, and 1.5 kg of carrot is used instead of 8.5 kg of aloe, 1 kg of immortal herb, and 500 g of tomato.

COMPARISON 1

In the same manner as in Example 3, a pure, fermented and aged liquid is obtained by using 5 kg of aloe, 2.5 kg of kale, and 2.5 kg of carrot instead of selecting 8.5 kg of aloe, 1 kg of immortal herb, and 500 g of tomato.

COMPARISON 2

In the same manner as in Example 3, a pure, fermented-liquid is obtained by using 7.5 kg of aloe, 500 g of kale, and 2 kg of carrot instead of selecting 8.5 kg of aloe, 1 kg of immortal herb, and 500 g of tomato.

A senseous test of each of the fermented and aged liquids obtained above was conducted by 50 testing members with a 9-point score system to check their taste, color, and flavor. And, its results are shown in Table 1.

TABLE 1

| Sample | Senseous test on each sample | | | | | |
|---|---|---|---|---|---|---|
| | Example 1 | Example 2 | Example 3 | Example 4 | Comparison 1 | Comparison 2 |
| Aloe | 10 | 7 | 8.5 | 7.5 | 5 | 7.5 |
| Leaves | | 2 | 1 | 1 | 2.5 | 0.5 |
| Vegetables | | 1 | 0.5 | 1.5 | 2.5 | 2 |
| Sugars | 4 | 4 | 4 | 4 | 4 | 4 |
| Total (kg) | 14 | 14 | 14 | 14 | 14 | 14 |
| Taste | 8.35 | 8.16 | 8.30 | 7.65 | 5.50 | 6.60 |
| Color | 8.20 | 8.27 | 8.46 | 8.20 | 4.55 | 6.47 |
| Flavor | 7.85 | 7.65 | 7.90 | 8.75 | 6.73 | 5.30 |
| Ave. score | 8.13 | 8.03 | 8.22 | 8.20 | 5.60 | 6.12 |

As shown in Table 1, the results of senseous tests of liquids based upon the formula of this invention show that the taste, color and flavor of the same are good, but when deviated from the scope thereof, poor result was recorded.

EXAMPLE 5 AND 6

Pure fermented and aged liquid is obtained in the same manner as in Example 3, except the following: After adding fructose corn syrup to the pulverized mixing materials consisting of 8.5 kg of aloe, 1 kg of angelica utilis, and 500 g of tomato, they are mixed until the sweetness for each respective Example reaches 15 and 37 Brix. And no mark fructose corn syrup is added to fermentation liquid.

COMPARISON 3 TO 6

Pure fermented and aged liquid is obtained in the same manner as in Example 3, except the following: After adding fructose corn syrup to the pulverized mixing materials consisting of 8.5 kg of aloe, 1 kg of angelica utilis, and 500 g of tomato, they are mixed until the sweetness for each respective Comparison reaches 0, 5, 10, and 50 Brix instead of 25 Brix. Based upon the above, at a 35° C. fermentation process, the reaction rate and discoloration of liquid aloe mixture when various amount of sugars added, were investigated. The result is shown in Table 2.

TABLE 2

Reaction rate and discoloration of aloe in liquids with various amounts of added sugar

| | Exam. 4 | Exam. 5 | Exam. 6 | Comp. 3 | Comp. 4 | Comp. 5 | Comp. 6 |
|---|---|---|---|---|---|---|---|
| Swetness | 25 Brix | 15 Brix | 37.5 Brix | 0 (Sugar free) | 5 Brix | 10 Brix | 50 Brix |
| Time of discoloration | Stable (more than 7 days) | Stable (more than 7 days) | Stable (more than 7 days) | Discolored (within 15 hrs.) | Discolored (within 15 hrs.) | Discolored (within 48 hrs.) | Stable (more than 7 days) |

-continued

|  | Exam. 4 | Exam. 5 | Exam. 6 | Comp. 3 | Comp. 4 | Comp. 5 | Comp. 6 |
|---|---|---|---|---|---|---|---|
| Reaction rate | Good | Good | Good | Good | Good | Good | Slow |

EXAMPLE 7

Pure fermented and aged liquid is obtained in the same manner as in Example 3, except the following: After adding fructose corn syrup to a pulverized liquid mixture consisting of 8.5 kg of aloe, 1 kg of Angelica utilis, and 500 g of tomato, they are mixed until the sweetness of each reaches 15 and 25 Brix.

Ferment each liquid mixture at 20° C., 25° C., 30° C., and 35° C. And no more sugar is added to the fermented liquid.

COMPARISON 7

Pure fermented and aged liquid is obtained in the same manner as in Example 3, except the following: After adding fructose corn syrup to a pulverized mixture consisting of 8.5 kg of aloe, 1 kg of Angelica utilis, and 500 g of tomato, they are mixed until sweetness of each reaches 15 and 25 Brix.

Ferment each liquid mixture at 5° C., 10° C., and 40° C. And no more sugar is added to the fermented fluid.

The effect of sugar concentration and temperature on pH of the liquid mixture during the fermentation process was studied and the result is shown in Table 3.

TABLE 3

Change of pH during fermentation in accordance with sugar concentration and fermentation temperature

COMPARISON 8

In the same manner as in Example 3, pure, fermented and aged fluid is obtained except for using 1 kg of starter instead of 200 g and 500 g during fermentation.

The effect of the starter on pH change of the liquid mixture fermentation was studied and the result is shown in Table 4.

TABLE 4

Change of pH during fermentation when adding starter

|  | Temp (°C.) | | | |
|---|---|---|---|---|
|  | 35° C. | 25° C. | | |
|  | Class | | | |
|  | Example 2 | Example 3 | | Comparison 8 |
|  | Amount (%) | | | |
| Time(hr) | Starter free | 200 g | 500 g | 1 kg |
| 0 | 4.45 | 4.33 | 4.29 | 4.12 |
| 23.5 | 4.27 | 4.02 | 3.85 | 3.69 |
| 47.0 | 3.55 | 3.57 | 3.49 | 3.27 |
| 73.5 | 3.43 | 3.45 | 3.40 | 3.05 |
| 96.5 | 3.35 | 3.32 | 3.30 | 2.74 |
| Remarks | Good fermentation Compatible liking | Same as left | Same as left | Problems: Excessive perparation of Starter Increase of capacity for production facilities. Increase of |

| | Brix 15 Brix Class | | | | | | |
|---|---|---|---|---|---|---|---|
| | Example 7 | | | | Comp. 7 | | |
| Time (hr) | Temp | | | | | | |
| | 20 | 25 | 30 | 35 | 5 | 10 | 40 |
| 0 | 4.32 | 4.32 | 4.32 | 4.32 | 4.32 | 4.32 | 4.32 |
| 22.5 | 3.88 | 3.88 | 3.87 | 3.85 | 4.30 | 4.30 | 3.74 |
| 45.5 | 3.51 | 3.50 | 3.47 | 3.43 | 4.30 | 4.27 | 3.05 |
| 70.0 | 3.88 | 3.38 | 3.30 | 3.29 | 4.27 | 4.25 | 2.54 |
| 96.0 | 3.29 | 3.28 | 3.23 | 3.17 | 4.27 | 4.23 | — |
| 117.5 | | | | | 4.27 | 4.20 | |
| 142.5 | | | | | 4.27 | 4.15 | — |
| Remark | Good fermentation Compatible liking | Same as left | Same as left | Same as left | No fermentation | Same as left | Decomposition Bad liking |

| | Brix 25 Brix Class | | | | | | |
|---|---|---|---|---|---|---|---|
| | Example 7 | | | | Comp. 7 | | |
| Time (hr) | Temp | | | | | | |
| | 20 | 25 | 30 | 35 | 5 | 10 | 40 |
| 0 | 4.28 | 4.28 | 4.28 | 4.28 | 4.28 | 4.28 | 4.28 |
| 22.5 | 3.92 | 3.86 | 3.86 | 3.84 | 4.28 | 4.28 | 3.70 |
| 45.5 | 3.55 | 3.51 | 3.49 | 3.48 | 4.26 | 4.25 | 3.00 |
| 70.0 | 3.43 | 3.42 | 3.34 | 3.30 | 4.26 | 4.23 | 2.32 |
| 96.0 | 3.34 | 3.32 | 3.29 | 3.22 | 4.26 | 4.23 | — |
| 117.5 | | | | | 4.26 | 4.20 | |
| 142.5 | | | | | 4.26 | 4.19 | — |
| Remark | Good fermentation Compatible liking | Same as left | Same as left | Same as left | No fermentation | Same as left | Decomposition Bad liking |

-continued

| | Temp (°C.) | | |
|---|---|---|---|
| | 35° C. | 25° C. | |
| | | Class | |
| | Example 2 | Example 3 | Comparison 8 |
| | | Amount (%) | |
| Time(hr) | Starter free | 200 g | 500 g | 1 kg |
| | | | | processing cost |

The scope of this invention is not limited to Examples as above and those who are well trained in the technical field that belongs to this invention are able to make any variations and/or changes within the allowable scope of this invention.

In conclusion, several advantages, when the final product is manufactured with the process of this invention, can be enumerated as follows:

Sour taste from the organic acids and aromatic components produced by microorganisms during fermentation can contribute much to palatability;

With appropriate ratio of sugar and sweetness thereof, consumption becomes easier than before;

The gel substance of aloe remains unchanged due to the sugar added and its storage period can be further extended;

By inoculating aloe with friendly microorganisms and/or other vegetables, the metabolite and lactic bacteria contribute much to the efficacy of the final product. And through a period of several months of aging, the unpleasant taste and flavor of original aloe can be changed to be palatable, thus improving palatability.

What is claimed is:

1. A process for manufacturing a health-supplementary food containing aloe as an active ingredient, comprising, in the order recited, the steps of:
   a. washing aloe, fresh leaf vegetables including kale, root vegetables including carrot, and fruit including tomato thoroughly with water;
   b. pulverizing from 70 to 85 wt. % of aloe, from 10 to 20 wt. % of leaf vegetables including kale, from 5 to 15 wt. % of root vegetables and fruit including, respectively, carrot and tomato, into pieces having a length of 2 cm or less using a chopper to provide a pulverized mixture;
   c. mixing sugar with the pulverized mixture to provide a sugar concentration for the mixture of from 15 to 37.5 Brix;
   d. innoculating the mixture with from 2 to 5% by weight of a starter per 100% by weight of total starting materials, the starter having been cultured from a strain of Lactobacillus family grown in an MRS medium, in a fermenter at a temperature ranging from 20° to 35° C.;
   e. fermenting the mixture for from 48 to 96 hours;
   f. stopping fermentation when the mixture has a pH ranging from 3.2 to 3.7;
   g. squeezing the mixture using a press to obtain a fermented liquid;
   h. admixing additional sugar with the fermented liquid until homogenized to maintain the sugar concentration at a range of from 50 to 60 Brix; and
   i. aging the mixture at room temperature.

2. The process according to claim 1, wherein said sugar is at least one sugar selected from the group consisting of glucose, fructose powder, high fructose corn syrup, sucrose, maltose, lactose, and oligo saccharides.

3. A process for manufacturing a health-supplementary food containing aloe as an active ingredient comprising, in the order recited, the steps of:
   a. washing aloe, fresh leaf vegetables including kale, root vegetables including carrot, and fruits including tomato thoroughly with water;
   b. pulverizing from 70 to 85 wt. % of aloe, from 10 to 20 wt. % of leaf vegetables including kale, and from 5 to 15 wt. % of root vegetables and fruits including, respectively, carrot and tomato, into pieces having a length of 2 cm or less using a chopper to provide a pulverized mixture;
   c. mixing sugar with the pulverized mixture to provide a sugar concentration for the mixture of from 15 to 37.5 Brix;
   d. fermenting the mixture naturally for from 96 to 144 hours, without addition of a starter, in a fermenter at a temperature ranging from 20° to 35° C.;
   e. stopping fermentation when the mixture has a pH ranging from 3.2 to 3.7;
   f. squeezing the mixture using a press to obtain a fermented liquid;
   g. admixing additional sugar with the fermented liquid until homogenized to maintain the sugar concentration at a range of from 50 to 60 Brix; and
   h. aging the mixture at room temperature.

4. The process according to claim 3, wherein said sugar is at least one sugar selected from the group consisting of glucose, fructose powder, high fructose corn syrup, sucrose, maltose, lactose, and oligo saccharides.

5. A process for manufacturing a health-supplementary food containing aloe as an active ingredient, comprising, in the order recited, the steps of:
   a. washing fresh aloe thoroughly with water;
   b. pulverizing the aloe with a chopper to provide pieces having a length of 2 cm or less;
   c. adding sugar to the pieces to provide a sugar concentration ranging from 15 to 37.5 Brix;
   d. innoculating the pieces with from 2 to 5% by weight of a starter per 100% by weight of aloe, the starter having been cultured from a strain of Lactobacillus family, in a fermenter at a temperature ranging from 20° to 35° C.;
   e. stopping fermentation when the pieces have a pH ranging from 3.2 to 3.7;
   f. squeezing the pieces using a press to obtain a fermented liquid;
   g. admixing additional sugar with the fermented liquid until homogenized to maintain the sugar concentration at a range of from 50 to 60 Brix; and
   h. aging the mixture at room temperature.

6. The process according to claim 5, wherein said sugar is at least one sugar selected from the group consisting of glucose, fructose powder, high fructose corn syrup, sucrose, maltose, lactose, and oligo saccharides.

7. A process for manufacturing a health-supplementary food containing aloe as an active ingredient, comprising, in the order recited, the steps of:
   a. washing fresh aloe thoroughly with water;
   b. pulverizing the fresh aloe with a chopper to provide pieces having a length of 2 cm or less;
   c. adding sugar to the pieces to provide a sugar concentration ranging from 15 to 37.5 Brix;
   d. fermenting the pieces for from 96 to 144 hours naturally, without addition of a starter, in a fermenter at a temperature ranging from 20° to 35° C.;
   e. stopping fermentation when the pieces have a pH ranging from 3.2 to 3.7;

f. squeezing the pieces using a press to obtain a fermented liquid;

g. admixing additional sugar with the fermented liquid to maintain the sugar concentration in a range of from 50 to 60 Brix; and h. aging the fermented mixture at room temperature.

8. The process according to claim 7, wherein said sugar is at least one sugar selected from the group consisting of glucose, fructose powder, high fructose corn syrup, sucrose, maltose, lactose, and oligo saccharides.

* * * * *